US012096132B2

(12) United States Patent
Noh et al.

(10) Patent No.: US 12,096,132 B2
(45) Date of Patent: Sep. 17, 2024

(54) METHOD FOR ENHANCING FRAME RATE OF ELECTRO-OPTICAL EQUIPMENT USING COLOR CHANNEL EXTRAPOLATION ALGORITHM AND COLOR WHEEL

(71) Applicant: Defense Agency for Technology and Quality, Gyeongsangnam-do (KR)

(72) Inventors: Sang Woo Noh, Gyeongsangnam-do (KR); Tae Hwan Kim, Gyeongsangnam-do (KR); Jin Woo Ahn, Gyeongsangnam-do (KR)

(73) Assignee: Defense Agency for Technology and Quality, Gyeongsangnam-do (KR)

( * ) Notice: Subject to any disclaimer, the term of this patent is extended or adjusted under 35 U.S.C. 154(b) by 309 days.

(21) Appl. No.: 17/540,336

(22) Filed: Dec. 2, 2021

(65) Prior Publication Data

US 2022/0174212 A1 Jun. 2, 2022

(30) Foreign Application Priority Data

Dec. 2, 2020 (KR) ........................ 10-2020-0166524

(51) Int. Cl.
*H04N 23/951* (2023.01)
*G06T 7/194* (2017.01)
*G06T 7/20* (2017.01)
*H04N 23/10* (2023.01)

(52) U.S. Cl.
CPC ........... *H04N 23/951* (2023.01); *G06T 7/194* (2017.01); *G06T 7/20* (2013.01); *H04N 23/10* (2023.01); *G06T 2207/10024* (2013.01); *G06T 2207/20084* (2013.01)

(58) Field of Classification Search
CPC . G06T 2207/10024; G06T 2207/20084; G06T 7/194; G06T 7/20; H04N 23/10; H04N 23/125; H04N 23/55; H04N 23/951
USPC ........................................................ 348/169
See application file for complete search history.

(56) References Cited

U.S. PATENT DOCUMENTS

| 4,851,899 | A | 7/1989 | Yoshida et al. |
| 6,690,422 | B1 | 2/2004 | Daly et al. |
| 2007/0081086 | A1* | 4/2007 | Ingram ................. H04N 23/16 348/262 |

FOREIGN PATENT DOCUMENTS

| JP | 2005-260929 | | 9/2005 | |
| JP | 2005260929 | A * | 9/2005 | ............ G06T 5/003 |
| KR | 2010-0087963 | | 8/2010 | |
| KR | 20100087963 | A * | 8/2010 | ............ G06T 7/215 |
| KR | 102175192 | | 11/2020 | |

OTHER PUBLICATIONS

Kanamaru et al.(Machine translation of JP 2005-260929 A) (Year: 2005).*

(Continued)

*Primary Examiner* — Christopher S Kelley
*Assistant Examiner* — Ana Picon-Feliciano

(57) ABSTRACT

The present invention relates to a method of acquiring image data by attaching a color wheel filter and a motor to electro-optical equipment equipped with a Bayer pattern-based CCD, and then improving a frame rate of the electro-optical equipment by 3 times without resolution loss through post-processing using a color channel extrapolation algorithm.

6 Claims, 3 Drawing Sheets

(56) References Cited

OTHER PUBLICATIONS

Lee et al.(Machine translation of KR 20100087963 A) (Year: 2010).*

Tran et al.( Tran QN, Yang SH. Efficient video frame interpolation using generative adversarial networks. Applied Sciences. Sep. 8, 2020;10(18):6245.) (Year: 2020).*

Ground(s) of Reason of Rejection Dated Jan. 4, 2021 From the Korean Intellectual Property Office Re. Application No. 2020-0166524. (5 Pages).

Notice of Allowance Dated Feb. 8, 2021 From the Korean Intellectual Property Office Re. Application No. 2020-0166524. (6 Pages).

Tran et al., "Efficient Video Frame Interpolation Using Generative Adversarial Networks", Applied Sciences, 10(18), 6245:1-16, Sep. 8, 2020.

* cited by examiner

[Figure 1]
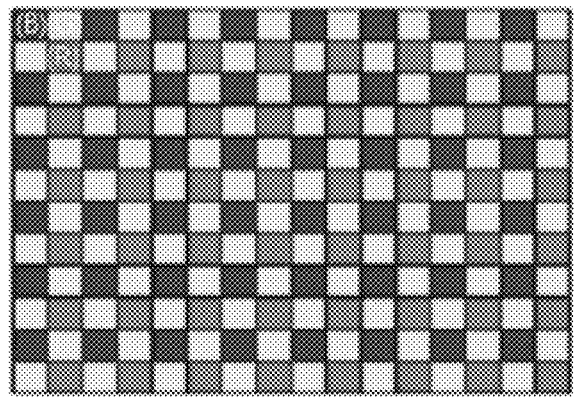
[Figure 2]
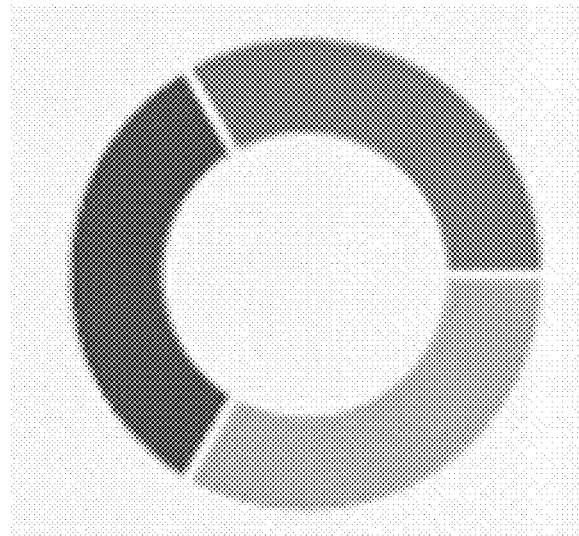

[Figure 3]
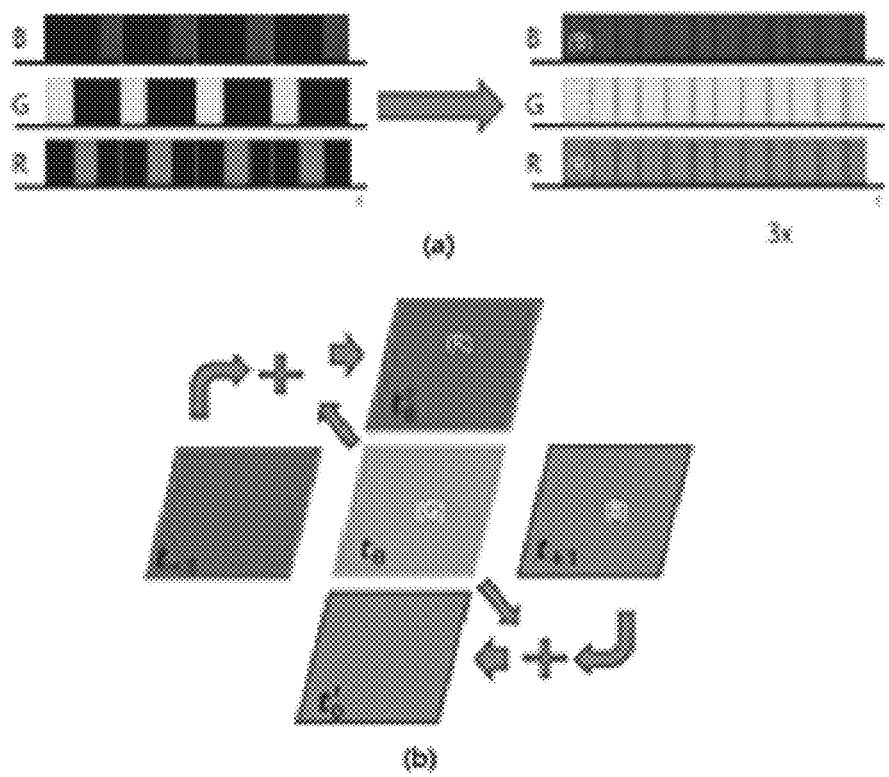
[Figure 4]

[Figure 5]

METHOD FOR ENHANCING FRAME RATE OF ELECTRO-OPTICAL EQUIPMENT USING COLOR CHANNEL EXTRAPOLATION ALGORITHM AND COLOR WHEEL

RELATED APPLICATION

This application claims the benefit of priority of Korea Patent Application No. 10-2020-0166524 filed on Dec. 2, 2020, the contents of which are incorporated herein by reference in their entirety.

FIELD AND BACKGROUND OF THE INVENTION

The present invention relates to a method of acquiring image data by attaching a color wheel filter and a motor to electro-optical equipment equipped with a Bayer pattern-based CCD (charge coupled device), and then improving a frame rate of the electro-optical equipment by 3 times without resolution loss through post-processing using a color channel extrapolation algorithm.

Electro-optical sensors have been used in various surveillance and reconnaissance weapon systems, from large surveillance and reconnaissance systems such as reconnaissance satellites and medium altitude/high altitude unmanned aerial vehicles to ground unmanned robots and personal observation equipment.

The required spatial resolution and temporal resolution of the electro-optical sensor vary according to the operationally required performance for each weapon system. Most image sensors take images at 30-60 frames/sec, and thus if movement and change of a target are faster than this, it is necessary to increase a frame rate. As a method for increasing the frame rate, there are a method of using high-end hardware such as a high-speed camera, and a temporal super resolution technique using an image processing algorithm. The high-end hardware guarantees high performance, but the price of the equipment is very high. If the temporal super resolution technique is used, the performance is insufficient compared to high-end hardware, but the frame rate can be increased even in a general electro-optical sensor.

SUMMARY OF THE INVENTION

It is an object of the present invention to provide a method for enhancing a frame rate of electro-optical equipment.

In order to achieve the above-described object, the present invention provides a method for enhancing a frame rate of electro-optical equipment, comprising: a first step of controlling data acquired from each channel of the electro-optical equipment so as to be data of other time zones that are continuous on a time axis by using a color wheel filter; and a second step of generating data of each channel in all time zones by utilizing the acquired data between the respective channels.

In the present invention, the electro-optical equipment may be electro-optical equipment equipped with a Bayer pattern-based CCD (charge coupled device) sensor.

In the first step of the present invention, by using a color wheel filter, each of RGB (Red Green Blue) channels in the CCD sensor may be adjusted to acquire information of other continuous time zones.

In the first step of the present invention, the RGB three-division color wheel rotates at the same cycle as the image shooting frame rate in a state where a sequence is matched so that the moment crossing the color boundary of the color wheel and the starting point of image shooting are at the same time, whereby as the exposure time of each of the R, G and B sensors in the CCD is reduced by ⅓, the exposure time between the respective channels may be continuously continued.

In the first step of the present invention, the image photographed using the color wheel allows the R, G and B channels to hold successively different temporal information from each other, and in the second step, virtually completed RGB information corresponding to a specific time point may be created by using temporal information of other continuous channels before and after a specific frame.

In the second step of the present invention, by separating each RGB channel image to a foreground and a background with a moving object detection technique and reconstructing the foreground information using information of other continuous channels, the form of the RGB foreground at a specific time point for each continuous time point may be created and 3 virtual frames may be created from 1 frame by using the created RGB foreground.

In the second step of the present invention, a virtual RGB frame may be created from the information acquired in the first step by sequentially utilizing a technique of detecting a moving object and a generative adversarial network (GAN) algorithm.

In the second step of the present invention, only the moving object after detecting the moving object and processing the background removal may be used, and other channel information at the relevant time point may be created through the generative adversarial network (GAN) algorithm using continuous information of other channels.

In the second step of the present invention, a virtual RGB frame may be created from the information acquired in the first step by sequentially using a technique of detecting a moving object and an optical flow technique.

In the second step of the present invention, only the moving object after detecting the moving object and processing the background removal may be used, and other channel information at the relevant time point may be created through the optical flow technique using continuous information of other channels.

In the present invention, the frame rate of the electro-optical equipment may be improved by 3 times.

According to the present invention, after acquiring image data by attaching a color wheel filter and a motor to electro-optical equipment equipped with a Bayer pattern-based CCD, a frame rate of the electro-optical equipment can be improved by 3 times without resolution loss through post-processing using a color channel extrapolation algorithm.

BRIEF DESCRIPTION OF THE SEVERAL VIEWS OF THE DRAWINGS

FIG. 1 shows a Bayer pattern of a CCD, wherein (R) is Red, (G) is Green and (B) is Blue.

FIG. 2 shows a three-division color wheel.

FIG. 3 shows a frame rate improvement method using a color extrapolation method.

FIG. 4 shows a virtual image created by integrating consecutive R, G and B channel images.

FIG. 5 shows result images (right) reconstructed through a color extrapolation method using the images on the left.

DESCRIPTION OF SPECIFIC EMBODIMENTS OF THE INVENTION

Hereinafter, the present invention will be described in detail.

The present invention relates to a method of acquiring image data by attaching a color wheel filter and a motor to electro-optical equipment equipped with a Bayer pattern (FIG. 1)-based CCD, and then improving a frame rate of the electro-optical equipment by 3 times without resolution loss through post-processing using a color channel extrapolation algorithm. When image signals are transmitted in a screen display device, the frame rate refers to the number of frames transmitted per second in consideration of human visual characteristics and channel bandwidths, and the like.

The method for enhancing a frame rate of electro-optical equipment according to the present invention comprises: a first step of controlling data acquired from each channel of the electro-optical equipment so as to be data of other time zones that are continuous on a time axis by using a color wheel filter; and a second step of generating data of each channel in all time zones by utilizing the acquired data between the respective channels.

The electro-optical equipment may be electro-optical equipment equipped with a Bayer pattern-based CCD sensor. The Bayer pattern refers to a pattern crossed and disposed so that G is 50% and R and B are each 25% according to human visual characteristics, as shown in FIG. 1.

In the first step, by using a color wheel filter, each of RGB channels in the CCD sensor may be adjusted to acquire information of other continuous time zones. The color wheel is a color wheel in which RGB is equally divided into three along a circle as in FIG. 2.

Specifically, in the first step, when the RGB three-division color wheel (FIG. 2) rotates at the same cycle as the image shooting frame rate in a state where a sequence is matched so that the moment crossing the color boundary of the color wheel attached to the electro-optical equipment and the starting point of image shooting are at the same time, as the exposure time of each of the R, G and B sensors in the CCD is reduced by ⅓ as in the left diagram of FIG. 3(a), the exposure time between the respective channels may be continuously continued. Each frame photographed in the above manner may be separated into three frames having only single channel information of different time zones from each other.

As above, the image photographed using the color wheel allows the R, G and B channels to hold successively different temporal information from each other, where in the second step of the present invention, virtually completed RGB information corresponding to a specific time point may be created as in the right diagram of FIG. 3(a) by using temporal information of other continuous channels before and after a specific frame as in FIG. 3(b).

Specifically, six virtual single-channel image frames may be created by using three separated single-channel image frames and a color information extrapolation algorithm, and the frame rate may be increased by three times as in the right side of FIG. 3(a). More specifically, as shown in FIG. 3(b), based on the G channel image at time point $t_0$, virtual R channel image and B channel image at time point to may be created from the R channel image at time point $t_{-1}$ and the B channel image at time point $t_{+1}$ by using the color information extrapolation algorithm. As such, an image of a channel for each time point that did not exist may be reconstructed from the images of the adjacent channels through the extrapolation method.

The color information extrapolation algorithm is a method that even if successive frames in the image each have information of one different channel, information of the channel, which did not exist in the relevant frame, are virtually created for the successive frames by using information of other adjacent channels, which refers to reconstructing an image having information of all channels for each frame. The color information extrapolation algorithm that can be used in the present invention is a generative adversarial network (GAN) algorithm, an optical flow estimation technique, and the like.

The generative adversarial network (GAN) is one of machine learning methods that automatically create images or videos close to the real thing while generative models compete with discriminant models. Specifically, as it is learned by the following formulas, a function P for estimating movement of a next frame with an improved frame rate by 3 times, and generators G1 (R→G), G2 (R→B), G3 (G→B), G4 (G→R), G5 (B→R), G6 (B→G) that converts the channel of the data can be made.

$$\min_T \sum \sum_3 \|x_{tn} - P_i G_i(x_{t(n+i)})\|^2 \quad [\text{Equation 1}]$$

$$L_T(P_3) = \sum_T \sum_3 \|x_{(t+1)n} - P(P(x_{tn}))\|^2 \quad [\text{Equation 2}]$$

In Equations 1 and 2, min is the minimum value function, T is the total time of the image, $x_{tn}$ is the n-th data value at time t, $P_i$ is the prediction function, $G_i$ is the generator function, $x_{t(n+i)}$ is the n+i-th data value at time t, $L_T$ is the loss function, and $x_{(t+1)n}$ is the n-th data value at time t+1.

The optical flow estimation technique is an algorithm for measuring motion between other channels, wherein in the present invention, a virtual channel image can be created by using an optical flow estimation technique that preserves fine motion. The optical flow estimation technique that preserves fine motion can increase targets which can be estimated as the optical flow motion by adding feature point matching and patch matching in addition to the gradual enhancement technique when setting the initial value, and can select whether optimization is performed based on color information or whether optimization is performed based on boundary information, for each region according to input data.

The optical flow estimating from two images $I_1$ and $I_2$ the motion between the two images is denoted by u. The optical flow obtained using only the progressive accuracy improvement technique system is called $u^c$. The existing optical flow is to obtain u through optimization to minimize Equation 3 below in the candidate group $u^c$.

$$E_D(u) = \sum_x \frac{1}{2}\|I_2(x+u) - I_1(x)\| + \frac{1}{2}\tau\|\nabla I_2(x+u) - \nabla I_1(x)\| \quad [\text{Equation 3}]$$

Here, τ is a constant to prevent the influence of color values and boundary values on the result from being biased, and ∇ is an operator that approximates the boundary line. Ed is an objective function, and x is a coordinate value.

Equation 4 can be minimized in the candidate groups $u^c$, $u^i$ and $u^n$ by obtaining the shift flow $u^i$ having a small density with the feature point matching, but showing the movement of the feature point, and the patch flow $u^n$ using the patch matching.

$$E_D(u, a) = \quad [\text{Equation 4}]$$

-continued $$\sum_x a(x) \|I_2(x+u) - I_1(x)\| + (1 - a(x))\tau \|\nabla(x+u) - \nabla I_1(x)\|$$

a(x) is a binary function that selectively selects boundary lines and color information. The patch flow $u^n$ using the patch matching can be obtained by minimizing Equation 5, N(x) of which means a 5×5 sized patch centered on x. E is an objective function, y and k need no definition.

$$E(u^n, a) = \sum_{y \in N(x)} \sum_k a(x) \|I_2^k(y + u^n(x)) - I_1^k(y)\|^2 \quad \text{[Equation 5]}$$

$u^i$ is obtained as a set of matrixes, where the matrix is obtained from how the respective feature points moved on the coordinate plane through feature point matching between two images.

When an image is taken by attaching a color wheel to the front part of the electro-optical equipment, the background without motion is similar to that of taking a general image, and the moving foreground can be acquired as the image similar to FIG. 4 where RGB blur occurs. FIG. 4 is virtual frames in which the time points at which the images are captured for each channel are different by collecting information of the respective channels corresponding to the R, G and B channels of three consecutive frames of a general video image.

In the second step, if the images of the respective RGB channels are separated into the foreground and background by using the moving object detection technique and the foreground information is reconstructed using information of other continuous channels, the form of the RGB foreground at a specific time point for each consecutive time point can be created. By utilizing the created RGB foreground, three virtual frames can be created from one frame as shown in FIG. 5. The left side of FIG. 5 is the above-created virtual frames, wherein it is 8 frames/second, and the right side is the experimental result that virtual channel images, which have been created by applying R, G and B of the left image and the optical flow technique to preserve fine motion, are combined to triple the frame rate to 24 frames/second.

In order to reduce mismatch between a foreground and a background, the extrapolation algorithm can be used for only the foreground after separating the foreground and the background. A robust principle component analysis algorithm as the moving object detection technique can be used for background reduction. Specifically, when a background is taken, it can be extracted as a principle component, and when a moving object is taken, it can be expressed as an outlier and separated from the background. A channel image of one frame can be created by combining the virtual foreground image obtained by the extrapolation method with the existing background image for each relevant channel.

According to one embodiment, in the second step, a virtual RGB frame may be created from the information acquired in the first step by sequentially utilizing a technique of detecting a moving object and a generative adversarial network (GAN) algorithm. In this case, only the moving object after detecting the moving object and processing the background removal may be used, and other channel information at the relevant time point may be created through the generative adversarial network (GAN) algorithm using continuous information of other channels.

According to another embodiment, in the second step, a virtual RGB frame may be created from the information acquired in the first step by sequentially using a technique of detecting a moving object and an optical flow technique. In this case, only the moving object after detecting the moving object and processing the background removal may be used, and other channel information at the relevant time point may be created through the optical flow technique using continuous information of other channels.

As such, the frame rate of the electro-optical sensor equipped with a general Bayer pattern CCD can be increased by three times by using the color wheel filter and the color information extrapolation algorithm. Since the technique proposed in the present invention improves the frame rate by using color information unlike the existing methods, it can be used in combination with the existing methods using general cameras, thereby improving the frame rate by 3 times from the threshold limits of the existing methods.

What is claimed is:

1. A method for enhancing a frame rate of electro-optical equipment, comprising:
    a first step of controlling data acquired from each channel of the electro-optical equipment so as to be data of other time zones that are continuous on a time axis by using a color wheel filter; and
    a second step of generating data of each channel in all time zones by utilizing the acquired data between the respective channels,
    wherein the electro-optical equipment is electro-optical equipment equipped with a Bayer pattern-based CCD (charge coupled device) sensor,
    wherein, in the first step, by using a color wheel filter, each of a plurality of Red Green Blue (RGB) channels in the CCD sensor is adjusted to acquire information of other continuous time zones,
    wherein, in the first step, the RGB three-division color wheel rotates at the same cycle as the image shooting frame rate in a state where a sequence is matched so that the moment crossing the color boundary of the color wheel and the starting point of image shooting are at the same time, whereby as the exposure time of each of the R, G and B sensors in the CCD is reduced by ⅓, the exposure time between the respective channels is continuously continued,
    wherein, in the first step, the image photographed using the color wheel allows the R, G and B channels to hold successively different temporal information from each other, and in the second step, virtually completed RGB information corresponding to a specific time point are created by using temporal information of other continuous channels before and after a specific frame,
    wherein, in the second step, by separating each RGB channel image to a foreground and a background with a moving object detection technique and reconstructing the foreground information using information of other continuous channels, the form of the RGB foreground at a specific time point for each continuous time point is created and 3 virtual frames are created from 1 frame by using the created RGB foreground.

2. The method for enhancing a frame rate of electro-optical equipment according to claim 1, wherein
    in the second step, a virtual RGB frame is created from the information acquired in the first step by sequentially utilizing a technique of detecting a moving object and a generative adversarial network (GAN) algorithm.

3. The method for enhancing a frame rate of electro-optical equipment according to claim 2, wherein in the second step, only the moving object after detecting the moving object and processing the background removal is used, and other channel information at the relevant time point are created through the generative adversarial network (GAN) algorithm using continuous information of other channels.

4. The method for enhancing a frame rate of electro-optical equipment according to claim 1, wherein
in the second step, a virtual RGB frame is created from the information acquired in the first step by sequentially using a technique of detecting a moving object and an optical flow technique.

5. The method for enhancing a frame rate of electro-optical equipment according to claim 4, wherein
in the second step, only the moving object after detecting the moving object and processing the background removal is used, and other channel information at the relevant time point are created through the optical flow technique using continuous information of other channels.

6. The method for enhancing a frame rate of electro-optical equipment according to claim 1, wherein the frame rate of the electro-optical equipment is improved by 3 times.

* * * * *